(12) United States Patent
Baum-Waidner

(10) Patent No.: US 8,494,979 B2
(45) Date of Patent: Jul. 23, 2013

(54) DETECTION OF UNKNOWN SCENARIOS

(75) Inventor: Birgit Baum-Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 12/504,072

(22) Filed: Jul. 16, 2009

(65) Prior Publication Data
US 2009/0276382 A1 Nov. 5, 2009

Related U.S. Application Data

(63) Continuation-in-part of application No. 12/119,266, filed on May 12, 2008, now abandoned, and a continuation of application No. 11/029,448, filed on Jan. 5, 2005, now abandoned.

(30) Foreign Application Priority Data

Jan. 7, 2004 (EP) .................................. 04405013

(51) Int. Cl.
*G06K 9/6256* (2006.01)
*G06Q 50/265* (2006.01)

(52) U.S. Cl.
USPC ............................................ 706/12; 705/325

(58) Field of Classification Search
USPC .............. 705/7; 717/108; 713/201; 434/335, 434/362; 706/12, 15; 707/104.1
See application file for complete search history.

(56) References Cited

U.S. PATENT DOCUMENTS

2002/0133721 A1* 9/2002 Adjaoute ...................... 713/201

* cited by examiner

*Primary Examiner* — Traci Casler
*Assistant Examiner* — Bob R Chumpitaz
(74) *Attorney, Agent, or Firm* — Michael J. Buchenhorner; Vazken Alexanian

(57) ABSTRACT

The present invention provides methods, systems and apparatus for detecting unknown scenarios in a data processing system. An example method includes the steps of: providing known scenario data describing one or more known scenarios in a database; generating element data depending on the known scenario data to form a set of elements, wherein each element is related to at least an actor and the behavior of the actor; computing subsets of elements by combining at least some of the elements of the set in dependence on their corresponding behavior; generating new scenario data related to new scenarios depending on the subsets of elements; and comparing the known scenario data with the new scenario data in order to identify the unknown scenarios.

16 Claims, 11 Drawing Sheets

Enterprise (benign)

Assumption:
Send to Controller item invoice;

Requirement:
Receive from Supplier item invoice

Assumption:
Send to Supplier item payment (related to receive invoice)

Requirement:
Receive from Controller item approval "OK"(related to invoice)
Receive from Supplier item invoice

Controller (benign)

Assumption :
Send to enterprise item approval (" invoice OK")

Requirements:
Receive from Enterprise item invoice
Receive from itself the item "invoice OK"

Assumption:
Send to enterprise item approval_denied ("invoice not OK")

Requirements:
Receive from Enterprise item invoice
Receive from itself the item "invoice not OK"

Supplier (benign)

Assumption:
Receive from Enterprise item payment

Requirement:
Send to Enterprise item invoice;

Supplier (Laundryman, malicious)

Assumption:
Send to Enterprise item invoice;

Requirement:
    (Unconditioned)

Assumption:
Send to X item hidden_payment

Requirement:
Conspiring with malicious X {e.g., Enterprise, Controller}
Receive from Enterprise item payment
Send to Enterprise (corresponding) item invoice

Controller (conspiring_with_malicious_Supplier, malicious)

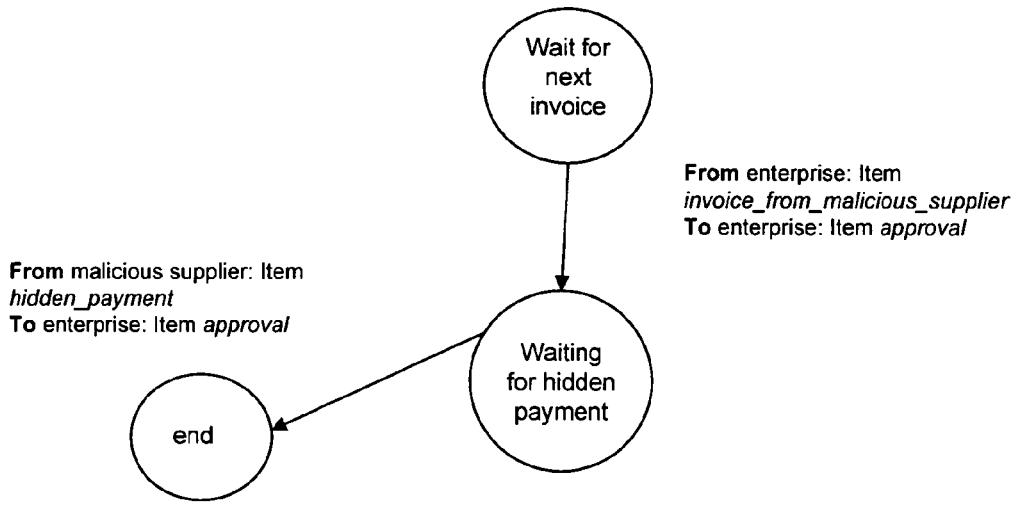

Controller (conspiring with malicious Supplier, malicous)

Assumption :
Send to Enterprise item approval "OK"

Requirement:
Conspiring with malicious supplier
Receive from Enterprise item invoice_from_malicious_supplier Assumption :
Receive from Supplier item hidden_payment;

Requirement:
Conspiring with Supplier
Receive from Enterprise item invoice_from_malicious_supplier

Fig. 3e

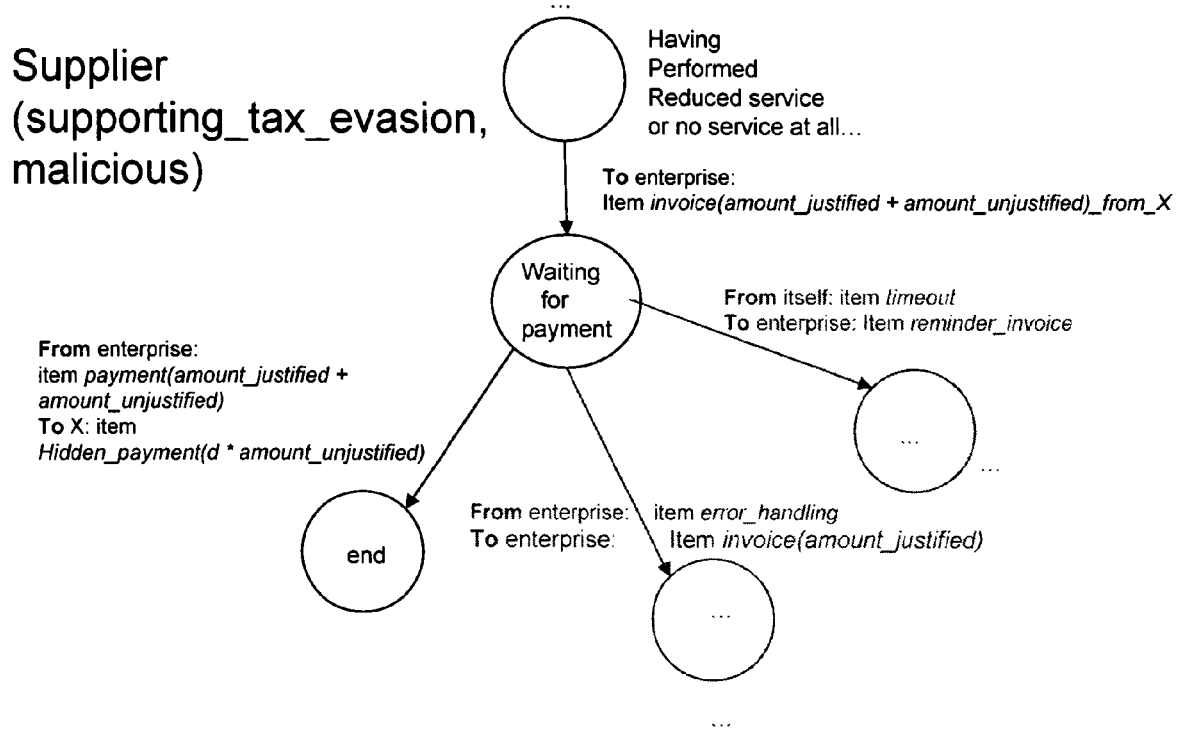

Supplier (supporting_tax_evasion, malicious)

Assumption:
Send to Enterprise item invoice (Amount_justified + Amount_unjustified);

Requirement:
(Unconditioned)

Assumption:
Send to any actor X item hidden_payment(d*Amount_unjustified);

Requirement:
Send to Enterprise item invoice (Amount_justified + Amount_unjustified);
Conspiring with that actor X related to this invoice
Receive from Enterprise item payment (Amount_justified + Amount_unjustified)

Fig. 3f

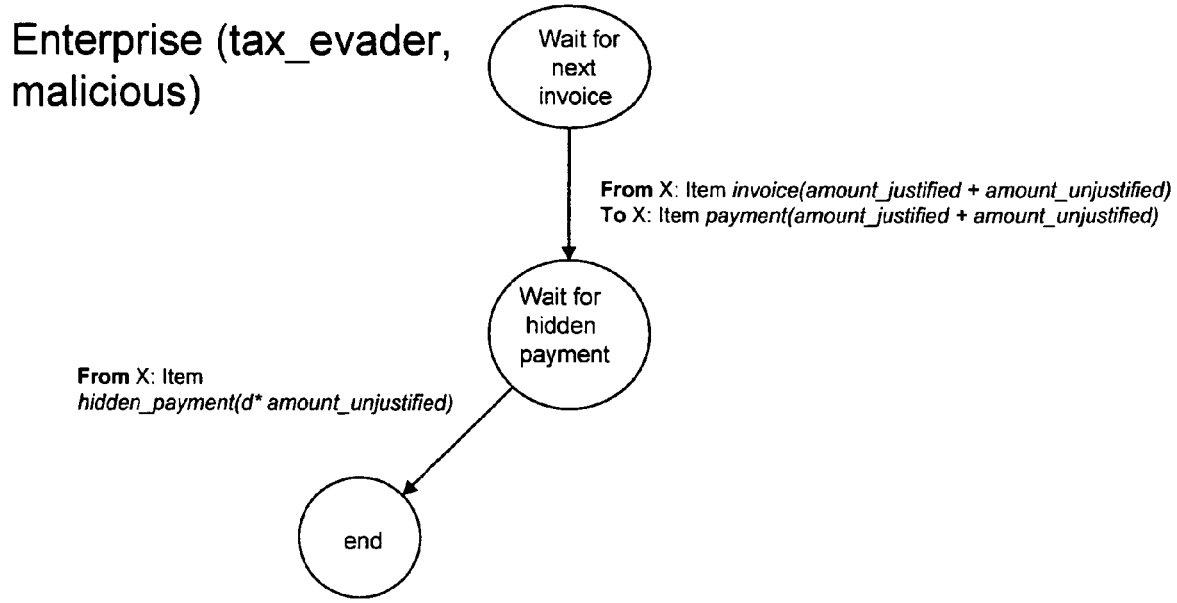

Enterprise (tax_evader, malicious)

Assumption:
Send to Supplier item payment(Amount_justified + Amount_unjustified);

Requirement:
Receive from Supplier item invoice(Amount_justified + Amount_unjustified)

Assumption:
Receive from Supplier item hidden_payment(d*Amount_unjustified)

Requirement:
Receive from Supplier item invoice(Amount_justified + Amount_unjustified)

Fig. 3g

DETECTION OF UNKNOWN SCENARIOS

CROSS-REFERENCE TO RELATED APPLICATIONS

This application is a continuation-in-part and claims priority from commonly-owned, co-pending U.S. patent application Ser. No. 12/119,266 filed on May 12, 2008, which is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention relates to a method for detecting unknown scenarios, particularly fraud scenarios to assess the fraud potential in existing or proposed solutions, for example in specific banking systems, e-business solutions or the like.

BACKGROUND OF THE INVENTION

Reducing the potential for fraud in existing or planned e-business systems requires identifying actual weaknesses and specifying, validating and implementing appropriate countermeasures. These countermeasures should not only deal with well-known and often exploited weaknesses but should also be effective against new, previously unknown ones. A comprehensive fraud management service uses up-to-date knowledge on systems, processes and scenarios and their weaknesses and risks and on possible countermeasures to regularly inform users on increased risks and to propose improvement for existing systems or to increase the security of planned systems during design. It is critical for this type of service to develop tools that help building and maintaining this knowledge and help exploiting this knowledge for identification of new fraud potential and for the creation of new countermeasures.

Apart from identifying fraud potential, it is also useful to identify potential for any other undesired effects, for example unintentional leak of information or general security breaches. It is also desirable to identify new useful scenarios, such as planning marketing events, games, trials or modeling use cases of a product.

Fraud happens if the fraudster successfully obtains items like money, information, goods or services owned by a victim without the victim's consent or knowledge or without the promised contractual return or compensation. More generally spoken, a fraud attempt happens if an entity such as an individual, a group, an institution, an enterprise or the like tries to unlawfully achieve an advantageous state. Fraud detection aims at detecting an attempt of fraud after or while it is happening in order to reduce or avoid any damage. Fraud prevention may be achieved based on fraud detection. Advantageously, fraud prevention may also be provided a priori by including appropriate measures when designing a "system".

The meaning of "system" refers to the system in which fraud takes place. The kind of system which is referred to depends on the level of refinement considered, for example, in a case when considering countermeasures against fraud. "System" might even mean the real life as such, for example if methods of fraud are searched which are related to interaction of different entities provided with dedicated economic behavior. "System" may also mean any e-commerce application software environment for client and server, optionally including the machines for client and server hosting both applications, optionally including networks or storing the media involved and interfaces to any procedures which take place non-electronically, for example a hand-written signature performed at a bank. Furthermore, "system" may mean any human and technical basis in any abstraction to enable all sort of fraud, also comprising completely different and even independent applications at different locations.

There is an increasing need of fraud prevention measures, as in electronic systems fraud attacks can for a lot of reasons be more effective than non-electronic fraud attacks: information can be immediately delivered to thousands and even millions of users; fraudsters can stay anonymous more easily; attacks are more easily performed against victims who want to remain anonymous; rumors can be spread very quickly and effectively and most people are typically inexperienced users of information technology (IT) equipment without sufficient knowledge or awareness of security or related suggestive measurements or care.

At present, there is no automatic way to identify new fraud scenarios based on any known fraud also in completely different applications or in different models, and therefore no automatic way of assessing potential for fraud. A common way is intuition, mostly without a thorough analysis of existing and potential fraud attacks or systems and the elements they consist of. For given or planned systems, the potential for fraud attacks can be identified by evaluating the correctness and security of the system based on a system model and on a fraud attacker model. Such evaluations are typically performed by parties interested in the correctness and security of the system. Such evaluations provide a good measure of whether the system fulfils certain security properties within the assumed model. Partly, they can also be performed automatically. A problem of such evaluations is that vulnerabilities outside the assumed model may be overlooked, for instance since the actual behavior of the users is insufficiently modeled, i.e. what else he is doing with his machine apart from the considered banking application, for example downloading, storing and executing other software. Such influence and side channels not reflected by the model are typically ignored.

SUMMARY OF THE INVENTION

It is therefore an object of the present invention to support risk assessment of improvements of systems in the design or redesign stage before they are implemented. It is a further object of the present invention to automatically detect new scenarios how actors in a system can act and/or interact, thereby performing actions according to an unknown scenario, for instance, a fraud which cannot be prevented by the countermeasures already implemented. Newly found scenarios which can possibly be performed within the system model can thereby be used to assess the potential for fraud and to implement the respective countermeasures.

According to a first aspect of the invention, there is provided a method for detecting unknown scenarios, advantageously in a data processing system. Known scenario data is provided in a database describing one or more known scenarios. Element data is created depending on the known scenario data to form a set of elements, wherein each element is related to at least an actor and the behavior of the actor.

Subsets of elements are computed by combining at least some of the elements of the set in dependence on their corresponding behavior. New scenario data is created related to new scenarios depending on the subsets of elements. The known scenario data is compared with the new scenario data in order to identify the unknown scenarios.

According to an embodiment for the detection of unknown scenarios, the unknown scenarios are detected in a system for which one or more scenarios and/or known elements are given. These given scenarios are split up into one or more elements wherein each of the elements is related to at least an actor and is related to a property associated to the actor and/or to an action associated to the actor and including an item and/or associated to requirements necessary to perform the action. The elements are combined with regard to the associated one or more requirements to obtain subsets of elements wherein each of the subsets describes one or more possible scenarios, describing one or more actors performing the related actions including at least one transfer of an item. The unknown scenarios are then identified from the detected scenario.

According to another aspect of the invention, there is provided a method for verifying if a predetermined behavior can prevent a possible fraud scenario.

According to a further aspect of the invention, there is provided a computer system for detecting unknown scenarios.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 3a-g illustrates possible elements of an exemplary system of an economic environment;

Figure 1:
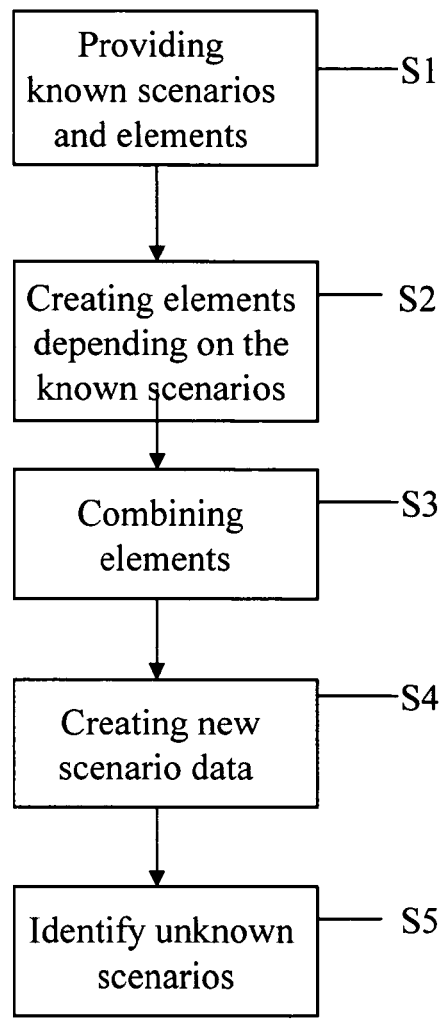
FIG. 1 shows a flow chart representing general steps of one embodiment in accordance with the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The present invention supports risk assessment of improvements of systems in the design and/or the redesign stage before they are implemented. In an embodiment, the present invention automatically detects new scenarios of how actors in a system can act and/or interact, thereby performing actions according to an unknown scenario. For example, in the case of a fraud which cannot be prevented by countermeasures already implemented. Newly formed scenarios which can possibly be performed within the system model can thereby be used to assess the potential for fraud and to implement the respective countermeasures.

Thus the invention provides a method for detecting unknown scenarios, advantageously in a data processing system. Known scenario data is provided in a database describing one or more known scenarios. Element data is created depending on the known scenario data to form a set of elements, wherein each element is related to at least an actor and the behavior of the actor. Subsets of elements are computed by combining at least some of the elements of the set in dependence on their corresponding behavior. New scenario data is created related to new scenarios depending on the subsets of elements. The known scenario data is compared with the new scenario data in order to identify the unknown scenarios.

Advantageously, known element data is added to the created element data to obtain the set of elements. The creating of element data further includes extracting one or more element data from the scenario data. At least one of the behaviors related to the elements can be associated with a requirement related to the respective element and includes at least one of a property associated with the actor and an action associated with the actor, wherein the action includes the transfer of an item.

According to an embodiment for the detection of unknown scenarios, the unknown scenarios are detected in a system for which one or more scenarios and/or known elements are given. These given scenarios are split up into one or more elements wherein each of the elements is related to at least an actor and is related to a property associated to the actor and/or to an action associated to the actor and including an item and/or associated to requirements necessary to perform the action. The elements are combined with regard to the associated one or more requirements to obtain subsets of elements wherein each of the subsets describes one or more possible scenarios, describing one or more actors performing the related actions including at least one transfer of an item.

The unknown scenarios are then identified from the detected scenarios. Advantageously, the identifying of unknown scenarios comprises the comparing of the scenarios defined by the subsets of elements with the provided one or more scenarios and other known scenarios to detect unknown scenarios. This provides a way to detect unknown scenarios in a given system defined by one or more given scenarios and/or by one or more given elements and allows the user to assess the unknown scenarios relevant for the given system related to the user and in case of an undesired scenario to include countermeasures into the system to prevent that the detected unknown scenario can be performed in the given system. In case that the unknown scenarios are fraud scenarios wherein one entity is a fraudster, the disclosure is a basis for the possibility to apply fraud prevention in a running system and in a system to be implemented. The invention is not restricted to one system model only but even allows patterns of completely different system models to be combined to new scenarios.

The creating of element data can comprise the step of describing the element using a state transition description which can be in a computer language and can be implemented efficiently. Advantageously, the combining of the elements to obtain sub-sets of elements is done by defining an end state first in which a possible unknown scenario can result. The end state can be described as a state in one or more elements in which a possible unknown fraud scenario can result. It is not necessarily an end state of one of the known scenarios. Starting from the selected end state, a scenario tree is determined having one or more paths including a start node being the root of the tree, one or more middle nodes, and one or more end nodes.

The start node, the middle nodes and the end nodes are interconnected to form the scenario tree. The start node represents at least an assumption which should hold to ensure that the end state can be reached or which describes the end state. Each of the middle or end nodes are assigned to none, one or more elements of the same actor and represent at least one assumption referring to one or more actions of an actor to be performed or one or more states to be set according to the one or more assigned elements. Each middle or end node represents none, one or more requirements concluded from the assigned elements wherein the requirements have to be complied with to allow at least one of the assumptions to be enabled, wherein the validity of the assumption is necessary to comply with one or more requirements represented by one or more nodes of the respective path from the start node to the parent node of the respective middle or end node.

Each of the requirements of the nodes of one path is complied with by one of the assumptions or requirements in the path, while for different possibilities to comply with one requirement of a node, different paths can exist containing that node. The assumptions and/or with the requirements complying action(s) or fact(s) in the nodes of each of the paths of the scenario tree indicate a set of actions and states of the scenario, defined by the respective path.

By determining a scenario tree, the elements are combined in a manner which allows to exclude combinations of elements which are not able to be combined and therefore do not represent a possible scenario. After determining the scenario tree, the paths describe the one or more given scenarios as well as the unknown scenarios which are detected by combining the elements. The elements are assigned to the nodes so that the nodes of a path represent a compressed specification of the detected scenarios.

Advantageously, the scenario tree is determined by successively adding nodes to a provided start node containing the one or more assumptions defining the end state. To the start node, one or more elements related to the assumptions in the node are assigned, wherein none, one or more requirements of the respective elements concluded from the assumptions in the node according to those one or more elements are added to the node. For a given path, an assumption of a given node is considered as being enabled for that path, if the respective elements assigned to the node do not include requirements for that assumption and do not cause contradictions to assumptions referring to the same actor in any nodes of the path, or if all requirements of the node are complied with by assumptions or requirements in terms of actions and/or states, in that path, and no contradiction referring to the same actor in any nodes of the path occur if the assumption is assumed valid. To build up the scenario tree, the following steps are repeatedly performed until all possible paths of the scenario tree are determined, all requirements have been considered, and, for each path, the assumption in the start node is either enabled or proved false. Given a current path, a node and one of the requirements of the node is selected, for which at least one unconsidered possibility exist to comply with an assumption and/or a requirement. For each different possibility for an assumption, not already contained in the path, to comply with the selected requirement, a node is created connected to the current end node of the current path, wherein the created node is assigned to the element containing the actions and/or facts corresponding to the assumption which complies with the requirement, wherein the created node represents none, one or more requirements which follow from the assumption, according to the assigned element.

A unique language for description of elements and nodes is desired, to enable an automatic decision if an assumption fulfils a requirement, or if a requirement is fulfilled by one or more enabled assumptions. Thereby also complex items (e.g., including any fields, including other items) can be matched by determining the less specific item which fulfils both items to be matched from the point of view of the element which is assigned to the node comprising the new matching item. Advantageously, that new matching item replaces, in the scenario tree, the original item of the corresponding element. This method to build up the scenario tree allows to find all possible combinations of the elements so that for a given system with given one or more scenarios and/or one or more given elements and the given end states all possible scenarios are detected.

It can be provided that successively nodes of the path are cut beginning with the end until no contradictions between assumptions and/or requirements of any nodes of the respective path exist and wherein a requirement is added in the last remaining node wherein the added requirement is the negation of the contradicting assumption or requirement. Furthermore, it can be provided that if the requirements for this assumption cannot be complied without causing contradictions, the assumption in a node is replaced by the contrary of the assumption. Thereby, all paths in the determined scenario tree are cut which include contradictions. Thereby it is further possible to create a node wherein the contrary of the assumption of an element is included if the assumption of the element cannot be enabled by fulfilling the requirements of the element.

The assumption of the currently created node can comply with the corresponding chosen requirement in another node by logic implication or by matching with the requirement (e.g., describing the same action from the point of view of a different actor). The created node represents one or more requirements concluded from the assigned element(s). The assumption of the currently created node can be enabled if the corresponding requirements are complied with. The requirements can on the one hand be fulfilled or they can be matched with an inter-dependent action such as "send an item" if "receive a corresponding item" is the requirement to be fulfilled, i.e., the matching action is related to the action of the requirement. In the latter case, the currently created node is in most cases assigned to an element with another actor than of the element the assumption is concluded from. Advantageously, the requirements of the node can be a combination of a number of requirements, e.g., a logic expression with AND, OR, NOT of requirements. The same holds for the assumptions.

It can be provided that the actor that is associated to an element is a person, a set of persons, a machine, a role, an organization or a company or the like. The respective actions can be included in the group of actions, such as authentication, authorization, sending, receiving, transferring, forwarding, encoding, decoding, verifying or the like.

It can be provided that the detecting of the unknown scenarios is performed by eliminating given known possible scenarios from the set of determined scenarios given in the scenario tree.

According to another aspect of the invention, a method for verifying if a predetermined behavior can prevent a possible fraud scenario is provided. The method for detecting possible unknown scenarios is performed using a first set of elements derived from one or more provided scenarios so that a first set of unknown scenarios is detected. The behavior is described by one or more elements which are added to the first set of elements or replace one or more elements of the first set of elements to receive a second set of elements. A method for detecting possible unknown scenarios is performed using the second set of elements so that a second set of unknown scenarios is detected. The first and the second set of unknown scenarios are compared wherein the result of the comparison indicates if the predetermined behavior can prevent one or more unknown scenarios. Thus, it might, e.g., be verified that less fraud happens in scenarios using some of the improved elements than in those corresponding scenarios using the old elements.

In an advanced embodiment, advantageously, e.g., if the behavior of certain actors is not known, a known element is generated for use in an above described method by repeatedly performing the following steps for one or more times. A transaction is provided wherein the transaction is performed with one or more actors, advantageously also including the provocation of exceptions to check out as many as possible reactions. As a result of the transaction a reaction related to the transaction is detected. An element is generated depending on the transactions and the corresponding reactions.

The transactions and/or the reactions can include a message and/or a transfer containing at least one of the items: offers, orders, invoice, request, information, codes, values, payments, goods.

Advantageously the element is generated by constructing a state transition diagram.

It can be provided that the element is generated by generalizing the reaction and the transaction wherein the generalizing is performed by replacing values by identifiers or replacing identifiers or constructs by more general identifiers.

Another option to generate a known element for use in the above mentioned method is given by the including of a modification of a given element according to a modification scheme. This modification scheme can include to omit actions and/or to turn the behavior of the element into another behavior.

The known element can also be generated by generalizing or by replacing a value by an identifier and/or by replacing an identifier and/or by constructing a more general identifier (which, e.g., stands for a construct of items or actions). It is also possible to generate the known element by making it more specific by replacing an identifier and/or a construct by a value or replacing a construct and/or an identifier by a more specific construct and/or an identifier.

According to a further aspect of the invention, there is provided a computer system for detecting unknown scenarios. The system comprises a scenario database for providing known scenario data describing one or more known scenarios. It further provides an element creating processor for creating element data depending on the known scenario data to form a set of elements, wherein each element is related to at least an actor and a behavior of the actor. By the aid of subset deriving means subsets of elements are computed by combining at least some of the elements of the set in dependence to their corresponding behavior. Further, scenario creating means creates new scenario data related to new scenarios depending on the subsets of elements. A comparator device compares the known scenario data with the new scenario data to identify the unknown scenarios. The means are a processor device or devices which perform the respective tasks and functions.

An embodiment of the computer system for detecting unknown scenarios comprises providing one or more given scenarios and single elements. It further comprises means for splitting scenarios into one or more elements wherein each of the elements is related at least to an actor and to a property associated to the actor and/or to an action associated to the actor and including an item and/or associated to requirements useful to perform the action. Means for combining the elements with regard to the associated one or more requirements to obtain subsets of elements are included, wherein each of the subsets describes one or more scenarios describing one or more actors performing the related actions including at least one transfer of an item. By the aid of means for identifying unknown scenarios, unknown scenarios can be detected from the detected scenarios.

According to yet another embodiment of the invention, there is provided a computer program product directly loadable into the internal memory of a digital computer. The computer program product comprises software code portions for performing the steps of the proposed method for detecting unknown scenarios, when the product is run on a computer.

In FIG. 1 it is shown how unknown scenarios can be detected. As a first step S1, one or more known scenarios, advantageously including one or more known fraud scenarios as well as intended benign scenarios are provided in the form of scenario data from a database or the like. The scenario can be described in a computer language or simply by a code stored in the database. The one or more known scenarios represent a system in which unknown scenarios shall be detected. The broader the area and the number of scenarios provided, the better is the chance to find a new unknown scenario.

In a further step S2, the provided known scenarios are split up into element data wherein the element data is generated depending on the known scenario data. The elements described by the element data are meaningful parts of the provided scenarios of the system, advantageously not just single messages. The provided scenario data is used to generate element data describing elements. For example, the scenario data is split up into element data. This could be performed in a manner that the original scenario can be obtained again by the following steps of combining the elements. This is performed by creating the elements according to the provided known scenario data. The elements are described in a way that allows a decision if two or more elements can be connected as described below. Additionally, single elements can be given already in step S1.

Elements, in a preferred embodiment, can be given very abstractly, for example only high-level assumptions, or in more detail or both. At least one of the elements is related to at least an actor and to the behavior of the actor. The behavior of the actor describes a relation to an action associated to the actor and including an item and/or describes the relation to a property associated to the actor. Each of the elements can further comprise requirements, preconditions and/or control attributes explained in detail below.

An element might be, but is not restricted to, the complete local protocol part of a business protocol played by one actor, e.g., the merchant, or just some small piece of such a protocol part. Advantageously, the element is any meaningful part of a communication protocol assigned to one actor, including at least any action or any facts or properties related to the actor.

Each element usually has assigned one main actor from the point of view of which the element is described. This can be a person, an enterprise, a machine, a role, a system or the like. A role implies that the person or machine behind it can change. The actor can be benign or malicious or indifferent, i.e. if no information is given on honesty at all. Other facts (e.g., properties of the actor) can be given as well in the element.

The element may represent a logical part of the scenario describing what an actor is doing (sending, leaking, penetrating, receiving, computing, concluding, deciding, providing, performing, typing, inserting a token, etc.) or willing or expecting to be doing in the scenario including which items are given to or received from other actors directly or indirectly. Certain elements of different actors might typically be combined in one scenario as well as different elements of one actor.

Elements can also comprise more than one actor, e.g. to show more details. Actors which are irrelevant for the consideration (with respect to the interaction with other elements) might appear or not appear within the element itself. For instance, consider that there is a controller in an enterprise. For a supplier who is only in contact with the enterprise it may be no difference whether the controller is an actor or not, so that it may be possible to comprise both elements related to the enterprise and to the controller in one single element. For a malicious supplier conspiring with the controller, both actors, enterprise and controller, might be relevant.

Actions describe what the actor is doing (sending, leaking, penetrating, receiving, concluding, designing, deciding, providing, performing, typing, inserting a token etc.) depending on the requirements to be fulfilled. Actions may also comprise computations, installations, dial-ins etc. If it makes sense to refine actions, this is done aided by an element structure. For instance, the action "make the victim download and store certain malicious software" on the attacker's side within one element can be described as the detailed steps useful for doing so with certain alternatives. For this purpose, the element having the action "make the victim install certain malicious software" might get a treelike sub-structure maybe linking other elements by the operator "or", each being a sub-tree of other elements that may be linked by the operator "and" (for example "prepare software downloadable from a webpage" and "send the victim information containing a link to that software").

The items play a role at the interfaces between elements. For instance, if the fraudster is able to obtain items like credit card information, a copy of a passport and of the driver's license from a victim, e.g., using a pyramid job scam, the fraudster can misuse those items later since there are several systems accepting such items as means for identification for someone's registration as a new customer who would later pay any services using these credit card information. The items often represent the connection between the elements since items are moved from one actor to another, thereby establishing the scenario or part of a scenario. Furthermore, the elements can describe properties which should be fulfilled before and after performing the actions. They might comprise any components which can refer to previous actions or might also include psychological components of a human actor, e.g. behavior or believe (i.e. trust in a merchant, a customer, in an offer, in a deal or in a product), a desperate need (i.e. the victim might be particularly prone to accept risky offers promising a lot of money) or the desire to help, e.g. the feeling of urgency of having to remove a virus from the disk and to rescue other persons as well (many hoaxes make use of such feelings of their victims). Correspondingly, elements can comprise facts fulfilling such requirements (e.g., the fact that the supplier is malicious or that a user is gullible or extraordinary helpful).

An element might optionally comprise control attributes to e.g. facilitate the search. For instance, one attribute could indicate the level of refinement of the considered elements with a restricted number of attribute values, for example numbers from 1 to 20. The search may be restricted to e.g. all elements from level 6 to level 10 and ignore any sub-trees specifying the element below level 6. This might reduce the chance to find new fraud attacks giving details on more refined levels than the operating system level. Moreover, it might not consider the general element of e.g. obtaining a victim's credit card information but instead all the known methods to achieve this, but nevertheless might return certain attacks in reasonable detail for certain purposes. To make controlling more meaningful, the assessment of the levels of refinement of the elements needs some common basis. An alternative could be to have attributes indicating whether the user of the method should be interactively asked for the level of refinement, e.g. if he wants more detailed elements to be considered. Another example for a control parameter are facts or preconditions, like properties, e.g., the honesty, i.e. if the actor of the element is to be considered (temporarily or statically) as benign, malicious, with unknown honesty or also as possibly benign, possibly malicious, which might also be used.

The description of elements can be based on a common language. Furthermore, a set of rules for interpreting the content of the elements might be useful, for example to enable an automatic recognition of implications, generalizations, common properties and other facts. As a third step S3 of the method for determining unknown scenarios, elements are combined. Two elements, typically having different actors, can be connected for interaction if a certain common flow of items can be expected (one actor sends, an actor of the other element receives) and the corresponding assumptions for those actions, if any, can be fulfilled. Generally two elements can be combined if the behavior of the related actors complies.

The same is true for intended actions in the requirements. Not all "expectations" of an actor have to be fulfilled in order to be connected and not all actions have to be performed. For instance, in the elements for a victim wherein the victim would expect a lot of money at the end but the malicious counterpart might be satisfied with what they have got and never send the final amount of money, those elements are connectible nevertheless. Finally, the expectations of at least one (malicious) actor should be able to be fulfilled as a criterion for a meaningful fraud scenario. Thus, the element for the victim would build a meaningful fraud scenario if connected to the malicious party that performs the fraud. For this reason, it seems obvious that those two elements should be considered connectible.

As another example, the element of a malicious controller of an enterprise wherein the controller is interested in receiving fake invoices and making its company pay them, can perfectly be connected to a laundry person that launders money and on his part is interested in issuing fake invoices and pretending a legally looking flow of money from a proper company to his account.

Two elements typically with the same actor can be connected sequentially if the facts and/or preconditions (e.g., results) of the former can fulfil the requirements of the latter one. For instance, consider an attacker who performs a fraud with victims who are made to perform a job in the role of another actor to find other victims. In the end, the attacker will be in the position not only to hold a lot of money but also of identity information of several victims. This assumption will be used to fulfil the requirement of the elements of the same actor to be able to perform impersonating attacks for those victims.

Additionally to splitting scenarios into elements and to providing single elements, further elements can be created by a generalization of one or more known elements by generalizing some components of it. A simple kind of generalization is that an element including "receiving" or "sending specified amounts of money" to another entity can be generalized to any amounts of money to be applicable also for other values.

A more complicated type of generalization is if a victim is actually prone to a dedicated scheme of fraud, the victim might be prone to any other scheme promising high amounts of money. Furthermore, new elements can be generated by the principle of matching, i.e. that refined elements can be constructed out of more generalized elements based on another element as candidate for being connected for interaction.

Furthermore, new elements can be created by a reasoning that is for example the intuition of the user, for example by adding more refined elements derived from more generalized elements. Furthermore, it might be possible to create malicious elements out of elements assumed benign or also modifying malicious elements into other malicious elements. A simple way to create malicious elements is to let the actor of a benign element just stop its actions after it is "satisfied", while another party might expect some item. For instance, if the buyer ordered and paid the goods, the malicious merchant is satisfied on his part, might take the money, disappear and never dispatch the goods. Even malicious actors may cheat each other when one of the actors does not forward the money it should have forwarded to the other malicious actor.

Furthermore, two elements can be connected if one action in one of the elements prescribes that the actions of the other element are to be performed, i.e., that the actor becomes also the actor of another element and would perform, e.g., the actions of that element that describes some job that promises a lot of money.

In preferred embodiments, the elements could be presented as objects in an object-oriented language, as for example in C++ or Java. One way to check the connectivity of two or more elements (as one alternative for building the scenario tree) would be to check if those objects can be executed in the considered way of connection and based on the requirements and the flow of items as well as the assumptions can be evaluated.

To build potential fraud scenarios, the created elements are combined. Each sub-set of combined elements provides a new scenario. New scenario data describing the new scenario(s) can be generated depending on the subsets of elements according to step S4, e.g. by simply adding the element data. After generating the new scenario data the elements the interesting unknown scenarios are detected by comparing the created new scenarios obtained with the known and/or given scenarios, as indicated with step S5.

Figure 2:
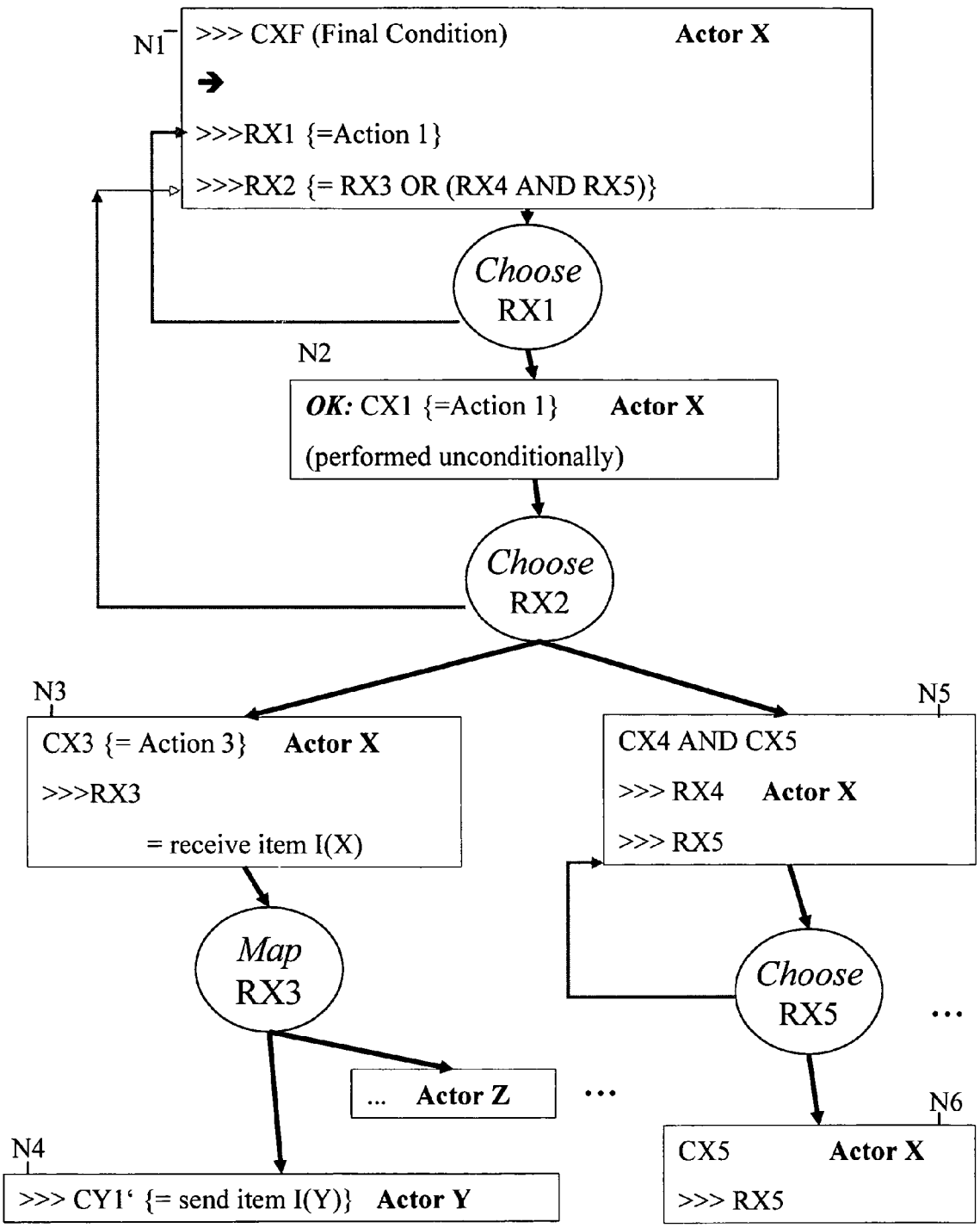
FIG. 2 illustrates the building of a scenario tree using nodes.
Figure 3A:
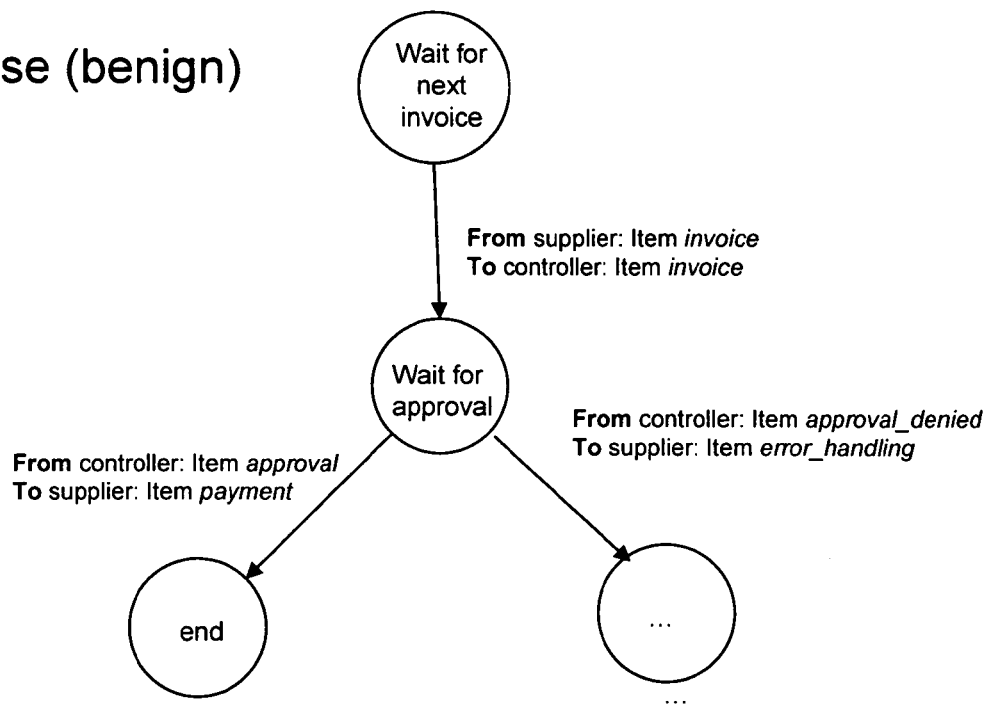
Figure 3B:
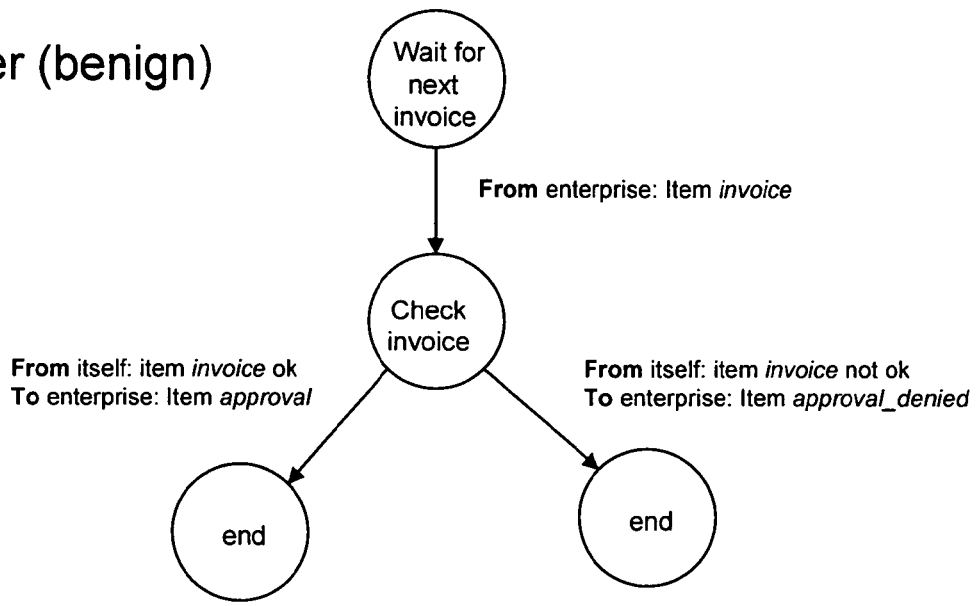
Figure 3C:
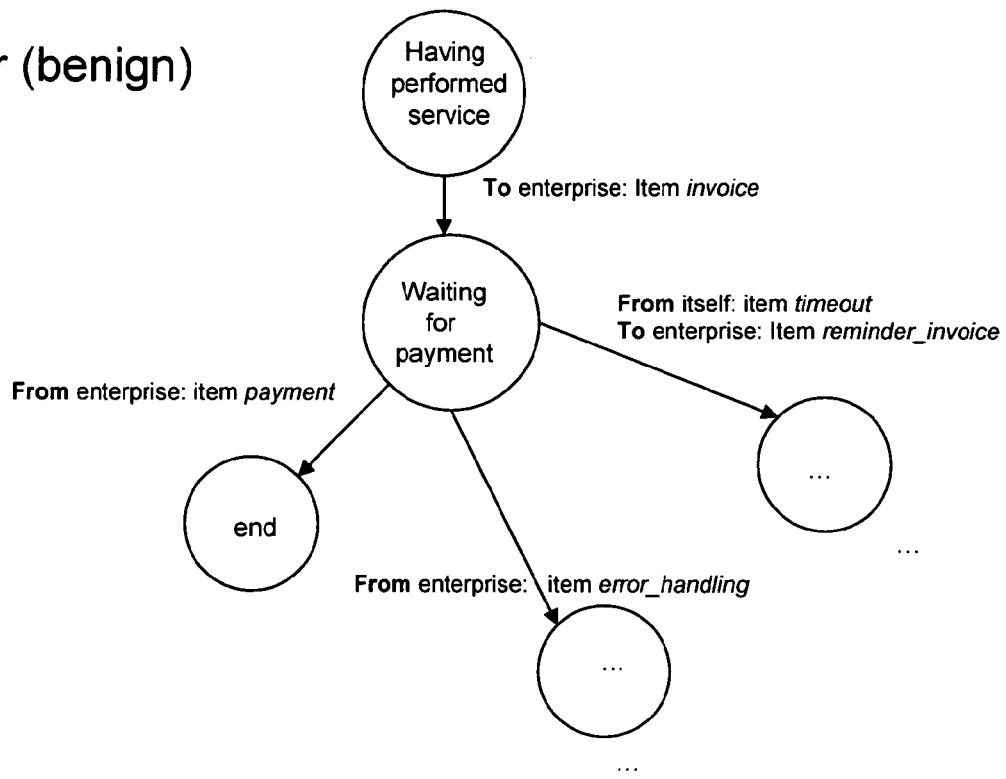
Figure 3D:
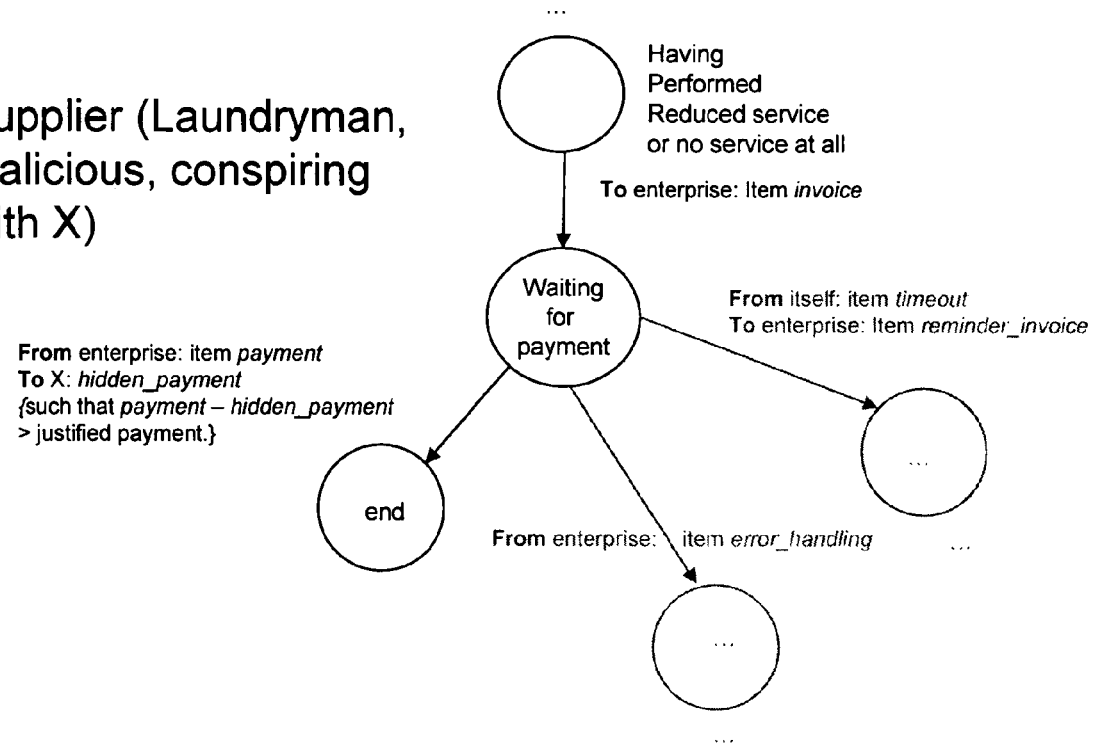

One method of detecting new scenarios is to construct a scenario tree wherein each path represents a possible scenario, as illustrated in FIG. 2. The path of the scenario tree comprises nodes N1-N6, each of which is assigned to one or more elements and represents at least one assumption referring to actions to be performed and/or states to be in said one or more assigned elements. Each of the nodes represents none, one or more requirements to be necessarily complied to enable the assumption. The nodes of one path of the scenario tree are derived from the elements wherein the scenario tree begins with a final assumption indicating the state in which the scenario should end, optionally including other assumptions (e.g., that a certain player is benign).

To establish the first node of the scenario tree, it is determined what elements are useful to arrive at the final assumption and a node is generated wherein from the final assumption CXF follow a number of requirements, e.g., RX1, RX2 which have to be both fulfilled to enable the final assumption.

In FIG. 2, the different requirements are indicated with their reference sign R and the corresponding assumptions with the reference sign C. The requirements, as well as the assumptions, can be combined with different logical operators such as "and", "or", "not" etc. Thus, each requirement can be a combination of a number of other or sub-requirements.

To build a scenario tree as it is schematically shown in FIG. 2, the start node N1 is created with the given final assumption CXF. In case that one or more elements can be assigned to that node, e.g., if the end state belongs to a certain selected element, the node is assigned to that element, e.g., Actor X. Otherwise, no element is assigned to the first node, in which case it is called N0, and alternative children nodes will be searched each assigned to one or more elements which comprise a case which can fulfil CXF from the one or more element's point of view. From this point on, each such node can again be considered as start node N1 assigned to one or more elements and comprising a final assumption, as shown in FIG. 2. The requirements to be fulfilled according to the elements are also assigned to the start node N1 (e.g., RX1 and RX2 in FIG. 2) and will be successively examined to find out what further assumptions extracted from any elements or assumptions or requirements already contained in the current path can fulfil or match the respective requirements. To construct further nodes of the scenario tree, a start-off is made with one of the requirements of node N1 as the first selected requirement wherein that requirement should match with an assumption which can fulfil—if enabled—that requirement. In the given diagram of FIG. 2, the requirement RX1 of the start node N1 was selected and matches with the assumption CX1 given in a newly created node connected to the start node N1. This newly created second node N2 is assigned to an element wherein an actor X unconditionally performs an action A1. As the assumption CX1 matches the requirement RX1, a connection between the start node N1 and the second node N2 can be established.

To the requirement RX1, no other possible match or fulfilling assumption in a further element exists, and no new requirement appeared. The only left requirement RX2, in this example at this node, is contemplated next. That requirement RX2 is a combination of a number of the sub-requirements RX3, RX4, RX5. Here, the next sub-requirement RX3 is selected to be examined. An "or" operation leads to a branching of the scenario tree wherein each operand of the "or" operation leads to a separated branch, each with the purpose to fulfil or match RX2. Thus, the requirement RX3 and the requirement (RX4 and RX5) lead to two separate branches. A third node N3 connected to the second node is established, holding CX3 as assumption and repeating RX3 as requirement.

It is noted that it is also possible to describe the method for detecting unknown scenarios by not making a difference between requirements and assumptions. In that case, the pure repetition of requirements identical with assumptions would be omitted. For a better understanding in this description of the method, however, this distinction is made. A preferred implementation would not make this distinction.

The requirement RX3 means an item was received. This requirement cannot simply be fulfilled within the same element but has to be matched by a complementary action such as that the item was sent by a different actor, herein actor Y. The matching element is assigned to a fourth node N4 which is connected to the third node N3. If the item can be sent by a number of different actors (e.g., also by Actor Z), the scenario tree branches into a number of nodes assigned to the number of elements related to the different actors, each of them related to the action "send the respective item".

Concerning the sub-requirement RX4 and RX5, which represent another option to fulfil the requirement RX2 of the first node N1, one of the sub-requirements RX4, RX5 (e.g., the next open requirement regarding from the start to the end node, or, e.g., the next requirement for which a fulfilling or matching assumption or requirement is found) is selected and elements are searched to find elements which contain assumptions which can directly fulfil or match the requirement RX4 or RX5, respectively. First, a new node, for example the fifth node N5, connected to the second node N2, is established, containing "CX4 AND CX5" as assumption, and listing the corresponding separate requirements RX4 and RX5, from which it is possible to choose a next requirement, here RX5. For this choice, a next node N6 is established which contains CX5 as assumption and repeats RX5. The search is continued to find the matching or fulfilling assumption to match the requirement RX5 and so on.

New branches and nodes might be added this way (not shown). In all paths starting with the node N6 containing assumption CX5, also a node containing assumption CX4 and requirement RX4 will be established, no matter exactly at which position in that path as that depends on the order in which requirements are chosen. If RX4 cannot be fulfilled or matched in one path from N5, that one path will not exist anymore in the end as RX4 is a requirement for the assumption in N5. Also, if it turns out that RX4 cannot be fulfilled in any path at all, also N5 will be cut finally. As a simplification of the method, no node containing assumption CX4 and the identical requirement RX4 has to be created at all if it can be concluded already from N5 that RX4 is fulfilled trivially (e.g., if it is an unconditioned action).

Given the generalized procedure, a scenario can be created having a path wherein all of the requirements given in the nodes of that path are fulfilled or matched by assumptions or already fulfilled requirements also given in the nodes of that path. If all requirements can be fulfilled or matched with, a possible scenario is created.

To ensure that no contradictions between assumptions of one node and another node of a specific path exist, the nodes of the path are cut beginning with the end node, advantageously during this procedure. The nodes are cut until no contradicting assumptions and requirements are left anymore. In case that it turns out that one requirement cannot be fulfilled or matched at all, i.e. in no path of the corresponding node, than this requirement can be replaced by its contrary and considered fulfilled. In case a requirement for an assumption in the same node was turned to its contrary (i.e., its logic negation), the assumption can also be turned to its contrary. Nodes with contradicting assumptions might advantageously be cut as soon as the contradiction becomes clear, or not be created at all, but this might not be clear immediately when or after creating that node.

While creating the scenario tree, it can happen that a requirement cannot be fulfilled or matched without causing a contradiction between any of the assumptions or requirements on the path from the start node to the node holding the respective requirement. In this case, the assumption in that node is replaced by the contrary of the assumption as an enabled assumption, provided that no other path comprising that node can ever exist which contains the fulfillment of that requirement.

In the following, as an example, unknown scenarios are created in an economic system comprising actors, such as an enterprise, a controller and/or a supplier. In a common economic scenario, an enterprise buys goods from a supplier and receives an invoice as a request to pay for the goods. The enterprise forwards the invoice to a controller who receives the invoice, checks it and returns the approval to the enterprise which pays the invoice to the supplier if the approval indicates that the invoice was OK.

According to this economic scenario, the elements of a benign enterprise, benign controller and a benign supplier can be created. Furthermore, possible known fraud scenarios can be indicated wherein there is a malicious enterprise, two different malicious suppliers and a malicious controller indicated in FIGS. 3a-3g. In the FIGS. 3a-3g, a state transition diagram describing the elements are shown. Below each of the state transition diagrams, it is demonstrated how assumptions to be used for nodes can be extracted from the elements, together with the requirements which follow from those assumptions.

For example, in case an enterprise (FIG. 3g) is conspiring with a supplier (FIG. 3f) with the purpose to evade taxes: if an invoice is sent to the enterprise without the delivery of any goods or with a delivery of goods or services of a lower value than reflected in the amount of the invoice, tax can be evaded by the enterprise. The enterprise can show the high invoice and also show the payment transaction to the supplier. The supplier might send part (maybe most) of the unjustified payment as hidden payment back to the enterprise. In this way, the supplier may also earn some money in the deal, additionally to selling services/goods, namely earnings=payment–justified payment–hidden payment.

In another, very frequent scenario, an embezzling controller (FIG. 3e) is conspiring with a malicious supplier (FIG. 3f) wherein the controller approves invoices from the supplier even if the amount is much too high. The enterprise employing the malicious controller pays the invoice, and in turn, the controller privately receives part of the difference as payment from the supplier in black money.

In another scenario, a laundry person (FIG. 3d) might conspire with a malicious controller (FIG. 3e) of an enterprise. The laundry person needs to show legal traces of where his money comes from. So the laundry person acts as a supplier. It might conspire with an enterprise or its controller and make them to accept high and (partly) unjustified invoices and providing an official payment transaction. In return, the unjustified part might be paid back, even with an additional compensation, as a hidden payment. The hidden payment has the amount <d*unjustified> (here, d>1). When looking how much black money was turned into white money and what was the cost of it, the white money <justified> is ignored which was gained from scratch. So it can be concluded: the amount <unjustified>+<(1−d)*unjustified> of black money was turned into the amount <unjustified> of white money.

These known scenarios, including the benign one, can be split up into elements which are shown in FIG. 3a-3g. FIGS. 3a-3g each show an illustration of the elements "enterprise (benign)", "controller (benign)", "supplier (benign)", "supplier (laundry person, malicious)", "controller (conspiring with malicious supplier, malicious)", "supplier (supporting tax evasion, malicious)" and "enterprise (tax evader, malicious)" in a plain text form and as a state diagram. In the plain text form, "assumptions" reflect facts or actions to be formed, and the "requirements" reflect the logic (not timely!) consequences, according to the element, under the assumption that those facts or actions were actually performed. For instance, in FIG. 3c, if the supplier received a payment, from this follows according to the element that the benign supplier should have sent a corresponding invoice before. "Requirements" are to be complied with to enable the assumption, but they are not (necessarily) sufficient to fulfil the assumption. For instance, if the benign supplier actually sent the invoice, from this does not follow at all that the supplier will ever receive a payment. This terminology using "assumptions" and "requirements" was chosen here to illustrate the correspondence to the "assumptions" and "requirements" as used in the nodes of the scenario tree.

Each of the elements includes one or more assumptions which are related to one or more requirements wherein the assumption can only be enabled if all its requirements are complied with. In the case that an assumption has no requirements, the assumption is assumed to be fulfilled. The state diagram of the different elements provides a simple way to describe the behavior of an actor.

The aim is to find a scenario tree which finally does not contain contradictions. Since the starting point shows how the new found scenarios, if any, will end (not the original scenario!), the a priori assumption, in the preferred embodiment, is that such a scenario exists, i.e., that the state after the last action of such a scenario can exist. This means, one can assume that this state was already reached, e.g., that a certain item was received. From this, requirements and other assumptions are concluded, as completely as possible, which typically should have been complied with and enabled before, respectively, e.g., other messages should have been received and thus sent before, and so on. If a scenario tree can be constructed this way, possible scenarios will be found.

A benefit of the presented method is that realistic and relevant scenarios, which can be built out of the given elements, are actually found with the presented method. The decision if a found scenario is considered a realistic and relevant scenario is taken outside of this method. The more complete the requirements are given to the assumptions, the more realistic the obtained scenarios will be.

This means, e.g., from any fulfilled requirements, it is not necessary to prove that the assumptions implying them are fulfilled, too, and the proposed method does not require this. However, for good results, i.e., for finding more specific and realistic scenarios, the requirements for an assumption used in the scenario tree should be complete with respect to the given elements. It cannot be proved that the assumptions are true, because other assumptions might prevent this. However, this is not needed because it is completely sufficient if there are circumstances such that the assumption can be true to find possible scenarios. Vice versa, if it is assumed certain assumptions to be true, it can be concluded that certain requirements should hold necessarily as a logic (not timely) consequence. Similarly, if an assumption in a new node (e.g., an item is sent from A to B) matches a requirement in a previous node (e.g., the same item must have been received by B), the fulfillment of the requirement cannot be concluded from the enabling of the assumption, e.g., there might be circumstances which prevent a sent message from being received. However, it is clear that a received message was sent, and that there exist circumstances such that it was received.

Given, that an assumption is enabled, it means that all of the associated requirements in the same node are complied with. After completing the method, it means that, according to the given elements, all useful requirements have been listed completely, if any, and for each of them (via separate assumptions in between), iteratively also all useful requirements are listed in the same path, and so on, without any contradiction. It can also mean that the path after the assumption is complete, with respect to the elements, and no obvious contradictions are included.

Given, an assumption fulfils a chosen requirement, while the assumption is not a match of an action from different point of views. The assumptions should actually be chosen in a way that they are identical to the corresponding chosen requirements. Only in case that the chosen requirement and its corresponding assumption belong to different elements of different actors, it is not necessarily true that the assumption fulfils the chosen requirement, as e.g., from "sending a message" does not follow that the matching action "receiving the message" is actually performed. However, usually circumstances exist such that this happens, and this is sufficient for finding possible scenarios.

Figure 4:
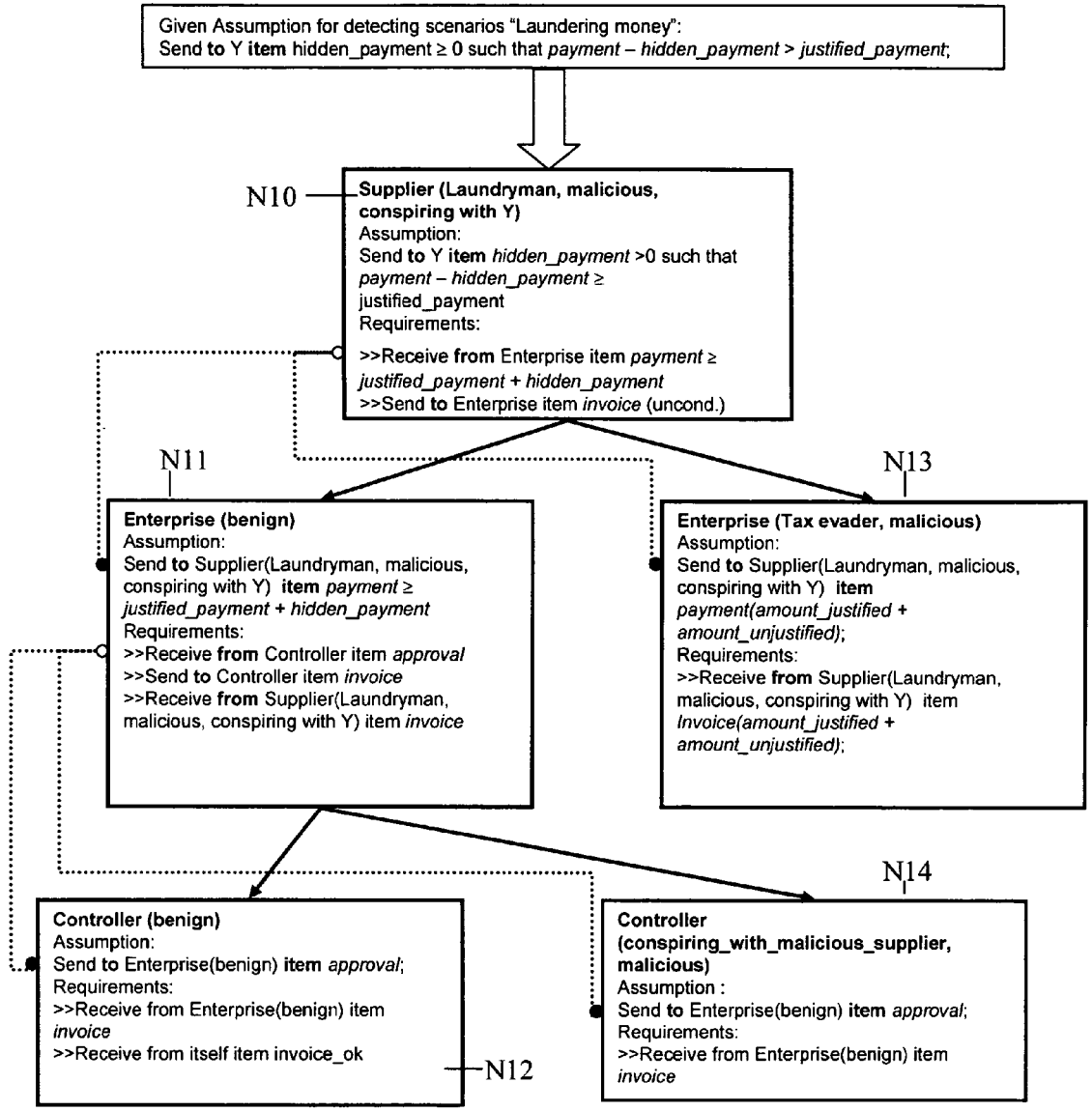
FIG. 4 shows a scenario tree generated by the elements given in FIG. 3.

In FIG. 4, an exemplary scenario tree is shown. The scenario tree to be created should detect scenarios wherein a malicious supplier is able to launder money which can be indicated, in this very simplified example, by sending a hidden payment, which is part of a received payment from the enterprise, to any actor.

These features are given in the element supplier (laundry person, malicious) so that the first node N10 is generated which is assigned to the element supplier (laundry person, malicious). The assumption of this node is set to "Send to Y item hidden_Payment>0 such that payment−hidden_payment.gtoreq.justified_payment." which is a more precise match to "Send to X item hidden_payment" in the element in FIG. 3d, while X is specified to Y and hidden_payment gets an additional property. For an easier understanding, in a preferred interpretation as used for this example, this assumption is considered as enabled. The aim of the method is to find out that the associated requirements are complied with or to show that they cannot be complied with. Thus, it is assumed that that payment was sent and seen if this leads to a contradiction or to a scenario without contradictions. Next, the requirements are added which can be concluded from this assumption. These are, (a) that the actor of that element, i.e., the laundry person, is conspiring with the malicious Y to which the payment is sent—this requirement can be considered immediately fulfilled, as it is local for the element (and anyway an a priori fact) and no contradiction occurs (a contradiction would, e.g., occur if the actor was benign, which it is not), (b) that the actor received from any enterprise item payment.gtoreq.justified_payment+hidden_payment, and (c) that the actor had sent to that enterprise the corresponding item invoice—this requirement can be considered as immediately fulfilled. Only requirement (b) is selected to build one or more nodes.

It is noted, that nodes are not necessarily identical to the defined elements, and are considered different objects in the preferred embodiment, because, e.g., an element might comprise actions which are not relevant for the scenario indicated by the path. These non-relevant actions can be caused by other requirements, or can be actions performed after the interesting end-assumption (start node) has been reached. As shown in the state diagrams of FIGS. 3a-3g, each next state depends on the previous state and an input (e.g., a received item or internal timeout message), and each state transition might produce an output (e.g., a sent item). All side branches of the element which are irrelevant for the path should not be reflected in the node. Otherwise, it is not clear which requirements should be fulfilled and which need not be fulfilled as there are many irrelevant requirements among them.

Optionally, facts can be stated in a node which hold for the complete element (e.g., that the actor is a controller, or that the actor supplier is malicious, or even conspiring with another malicious actor, etc.), then start with the assumption to be enabled, then step by step conclude all the requirements which have to be fulfilled within the node, to enable the assumptions. The easiest way to handle such facts is to consider them fulfilled requirements in the nodes. For a node, an assumption requires a state or an action in the element, and the requirements to enable the assumption might be the previous state and/or an action already performed in the element, or a series of actions performed, and additionally or alternatively, there might be other requirements.

The available elements are now searched for a match or a fulfilling assumption for the requirement "receive from enterprise item payment.gtoreq.justified_payment+hidden_payment". The requirement includes that the payment comprises an unjustified payment and a justified payment, from which it follows that some d*(unjustified_payment) has been sent as hidden payment to the conspiring party. The value of d is open here, it might be <1, =1, or even >1. As the type of the requirement needs a matching assumption, e.g., a more generalized assumption "send to supplier item payment", the elements enterprise (benign) and enterprise (tax evader, malicious) are found. For each of the found elements, a new node is created wherein each of the new nodes is connected to the first node N10. One of the newly created nodes, the second node N11, assigned to the element enterprise (benign), thus contains the assumption "Send to Supplier(Laundryman, malicious, conspiring with Y) item payment.gtoreq.justified_payment+hidden_payment." Note that "Supplier(Laundryman, malicious, conspiring with Y)" does not mean that the benign enterprise "knows" that the supplier is a malicious laundry person conspiring with some Y. It is just a code and means that the same actor is meant as was used in N10. The assumption is related to the requirement "receive from controller item approval OK" the approval of which refers to the invoice of the second requirement "Send to Controller item invoice" and to the third requirement "receive from supplier invoice". The third requirement can be matched to the corresponding sending action, an unconditioned requirement, in N10. This shortcut to match requirements with obviously fulfilled requirements is allowed, no own node including the requirement as assumption is needed. The second requirement can also be considered fulfilled as it is local (the actor just follows the protocol). Only for the first assumption, a mapping assumption (or requirement) should be looked for.

Furthermore, it is noted that not only a mapping between actors, actions, etc. but also a mapping between the involved items can be performed. In the preferred embodiment, in this way, actors, actions, items, assumptions, requirements etc. might become more specific along a path, because the mapping results have to match more specific values or variables. Example: The action "Send to Supplier item payment" as expressed in the element of the benign Enterprise will be more specific in the node: The Supplier might be mapped to the more specific Supplier(Laundryman, malicious, conspiring with Y). Also, more specific information might be added to the payment. The technique of mapping and matching expressions is not new. It is, e.g., a basic method used in the programming language PROLOG. Advantageously, the elements should be expressed in the same language and with some minimal conventions for formats such that a meaningful mapping is possible.

Moreover, most expressions are simplified in the example. In a further use of the presented method, the expressions should be so complete that it can automatically be interpreted which items are related to each other. For instance, from the invoice it would be clear to a malicious controller that it comes from a party conspiring with him and on what exactly is the purpose of the conspiring, and from the payment it is clear on which invoice it refers to. For instance, the invoice sent by the supplier and the payment paid by the enterprise have to be related so that it is clear that the payment is paid according to the sent invoice. Depending on the controlling level, payment and invoice should correspond to each other regarding the sender, recipient, the subject which has to be paid and/or the amount so that the sender of the invoice is the recipient of the payment and the sender of the payment is the recipient of the invoice.

Now, the requirement "receive from controller item approval OK" is chosen from N11. A search is carried out for an assumption matching that requirement, and the assumption "send to enterprise item approval OK" is found. This assumption can be extracted from the elements controller (benign) and controller (conspiring with malicious supplier, malicious). For each of the newly found elements, a new node is created which is connected to the second node N11. For a new third node N12 assigned to the element controller (benign), the matching assumption "send to enterprise item approval OK", the requirements "receive from enterprise item invoice" and invoice is checked as OK, are concluded and added. As described above, the invoice sent by the enterprise and the invoice received by the controller should match, and the approval should correspond, to enable that the requirement "Receive from Controller item approval" can be fulfilled.

As a next step the requirement "receive from enterprise item invoice" is chosen from N12 and searched for in the set of elements and in the node of the generated path given by the first node N10 and the second node N11. As the respective requirement "receive from enterprise item invoice" is matched by the enabled assumption of the second node N11 "send to controller item invoice," this requirement is considered as fulfilled, too, in this path. For the shown example the requirement "Invoice is checked as OK" is taken as fulfilled. The assumption that it is not true would cause a contradiction to above requirement immediately; both cannot exist at the same time. The aim is to find scenarios without contradictions. Though not reflected in the examples, any arbitrary assumptions might be added into a node, as long as those do not produce contradictions (which might turn out later), and advantageously as long as also the opposite assumptions are considered in the scenario tree finally (e.g., proved impossible).

For instance, the user of the proposed method might require that the scenarios should be differentiated according to benign controllers and malicious controllers, for each controller turning up. This means, each such path gets somewhere either assumption "controller is benign" or "controller is malicious" and cannot stay open, more paths might result this way, some paths might become more specific and others are cut soon. It might turn out later that "checked as OK" might never happen as well, due to the content of the message which might become relevant somewhere in the sub-tree below that node, and cause a contradiction then (this does not happen in the given example). Thus, all requirements from the elements for the approval to be sent to the enterprise are matched or fulfilled, and the sent approval again matches the first requirement of the second node N11. As for the path given by the first node N11, the second node N11 and the third node N12, all requirements are matched or being fulfilled, and no contradictions are left, a new scenario has been created. The assumption "Invoice is checked as OK" did not lead to a contradiction before the path was completed. A shortcut was used here as the corresponding requirement could also have been selected and repeated as an assumption without requirements in a new node. The preferred embodiment does without this additional node.

Because the controller is benign and actually checks the invoice and does not recognize the fraud, it follows that the fraud happens due to an inappropriate check. Otherwise there would be a contradiction between "controller benign" and payment>justified_payment. If the element of the controller is improved to truly check the invoice, thereby also checking that payment.ltoreq.justified payment, this fraud would be prevented, as can easily be verified by constructing the scenario tree.

Returning to the element enterprise (tax evader, malicious), which is assigned to a new fourth node N13 which is connected to the first node N10, the matching assumption "Send to Supplier(Laundryman, malicious, conspiring with Y) item payment(amount_justified+amount_unjustified)" matches the requirement "receive from enterprise item payment.gtoreq.justified_payment+hidden_payment". The payment from the malicious enterprise according to the fourth node N13 contains an unjustified amount of money which meets the requirement "receive from supplier item invoice including an unjustified amount of money". This requirement can be matched with the assumption "send to enterprise item invoice" (remark that also this invoice includes the unjustified amount of money and that it follows from the mapping that unjustified payment=payment−justified payment). There are no unsatisfied requirements left in this path. Thus, a completely new scenario is created given by a malicious supplier and a malicious enterprise which are able to cooperate and thereby to evade taxes and to launder money.

In a more detailed way to perform the described method, it could even been seen that the situation is much better for the laundry person here than in another scenario with the malicious controller where he has to pay a compensation for the deal (d>1). In a similar way, conspiring with the laundryman is better even for the enterprise evading taxes than conspiring with the malicious supplier who would want to earn money with the deal (d<1). If both, tax evader and laundryman, are doing without any compensation in either direction (i.e., d=1, which means <unjustified payment>=<hidden payment>), both malicious players can reduce their losses, compared with the other two known scenarios. This illustrates that a new found scenario can even be more effective than the comparable known scenarios.

Concerning the fifth node assigned to the element controller conspiring with malicious supplier, which is connected to the second node N11, the requirement "receive from controller item approval matches the assumption "send to enterprise item approval OK". The requirement given in the fifth node N14 "receive from enterprise item invoice" has to be fulfilled or matched with a respective assumption which can be found in given elements or in the nodes of the respective path of the scenario tree given by the second node N11 and the first node N10.

To minimize the resulting tree and to avoid the creation of double nodes, it is preferred to firstly search for requirements which are complied by assumptions and requirements already established in the existing current path before it is searched for assumptions in elements.

A matching requirement to the requirement "receive from enterprise item invoice" is the requirement "send to controller item invoice" which is already complied with and which can be found in the second node N11. Thus, a third scenario given by the nodes N10, N11, N14 is generated so that in the system given by the created elements as mentioned above three possible scenarios can be found when looking for the start assumption "Send to Y item hidden_payment>0 such that payment−hidden_payment.gtoreq.justified_payment".

Figure 5:
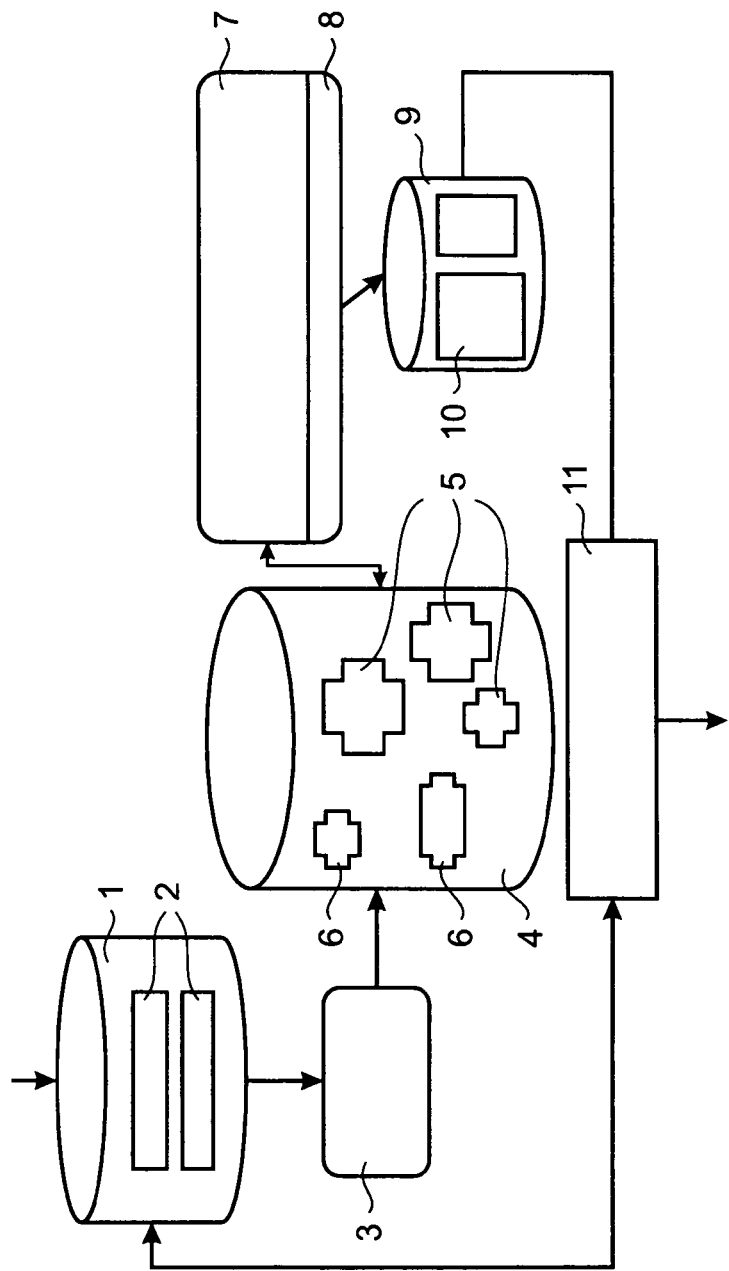
FIG. 5 shows a schematic diagram of a computer system for detecting unknown scenarios.

In FIG. 5 a schematic diagram of a computer system for detecting unknown scenarios is depicted. Known scenario data 2 indicating given known scenarios is provided in a known scenario database 1. The scenario data 2 describe one or more known scenarios.

The known scenario data 2 is processed by an element creating processor device 3 in which scenario data is input and by which element data is created. The created element data depends on the known scenario data from the known scenario database 1. Thereby, a set of elements is formed, wherein each element is related to at least an actor and a behavior of the actor. The set of elements are stored in an element database 4 wherein the stored elements are indicated by reference number 5. The known scenario database 1 and the elements database 4 can be included in different sections of a single database or locally divided. Additionally further single elements not related to a scenario can be included in the elements database 4 which are indicated by reference number 6.

The elements stored in the elements database 4 are now computed in the processor device 7. Therein, subsets of elements are determined by combining at least some of the elements stored in the elements database 4 of the set in dependence to their corresponding behavior. The combining of the elements to obtain the subsets of elements is performed according to the method described above. The subsets of elements are interpreted as new scenarios in a scenario creating means 8. Therein, new scenario data indicated by reference number 10 is created as new scenario data and stored in a new scenario database 9. Although scenario database 9 is depicted separated from the known scenario database 1 it is preferred to use a single database to store the known scenario data as well as the new scenario data.

By the aid of comparator device 11 the known scenario data 2 from the known scenario database 1 is compared with the new scenario data 10 from the new scenario database 9 to identify the unknown scenarios indicated by unknown scenario data provided at an output 12 of the comparator device 11.

The approach to generate new scenarios can be extended to consider countermeasures, to prevent or at least detect fraud attacks. Two principles are considered which might be included in this approach:

Known countermeasures might be recommended to single elements or sets of elements; and Elements or sets of elements (e.g., benign or fraud scenarios) can already include countermeasures themselves, and might iteratively be improved.

The first approach is able to be extended to comprise suggesting countermeasures. Additionally to the elements, several corresponding countermeasures, as far as known, can be stored in the database, applicable to any single element or set of (connectable) elements, in order to be able to propose countermeasures for newly found or already known fraud scenarios, wherever possible. This means, whenever a fraud scenario is found, corresponding measurements, as far as known to the database of the system realizing the presented method, can be returned as recommendation together with the respective fraud scenarios as a search result. Example: There might a general rule that between receiving an invoice and paying an invoice, a trustworthy party (here: a trustworthy controller in the enterprise) should validate that the value of service performed or goods delivered by another party (here: the supplier) corresponds to the amount in the invoice. Only after that step, the invoice can be paid. This might make the third scenario impossible. Note that the quality of such recommendations depends on the size and quality of the database of collected elements and their countermeasures.

For each element, or set of elements, some set or sets of countermeasures can be given. This might be done informally by giving that information in any possible way.

A preferred way, at least additionally to the informal way, would be to give the countermeasures formally, i.e., by telling which elements of one or more actors of the given set of elements would have to be replaced by which set of more appropriate elements, to make a certain attack impossible, or at least to allow fraud detection. Just adding elements realizing or integrating or supporting countermeasures is also possible. For instance, the element of the enterprise should be replaced by one including a trustworthy controller. Replacing malicious elements by benign elements will mostly not help, as this will just prevent finding fraudulent scenarios, although those might exist in reality. On the contrary, replacing malicious elements by even more malicious elements might return even more unknown fraud scenarios which might need more sophisticated improved elements to prevent them.

Such improvement proposals can themselves be described as element structures (e.g., with AND/OR expressions on any levels of refinement) as well. Links from the old to the new sets of elements (and vice versa) should be used here. This may also hold for the corresponding refined elements.

Together with improved elements, information might additionally be given about the chances and the preconditions to prevent, or reduce, damage of an attack, and what exactly is prevented or detected. Ideally, if one element applicable to the fraud attack is prevented completely or at least prevented to support the attacker, or at least if actions pre-paring fraud can be detected, the complete fraud attack, or at least part of the resulting damage, might be prevented or the attempt detected, e.g., for a certain potential victim. More than one way might exist to prevent malicious elements from damaging the victim. The better the information base of the system (the more countermeasures are known), the more countermeasures can be shown for certain (sets of) elements, for prevention or detection. Measurements for detection will especially be used where the elements are fixed and not able to be easily changed. Ideally, each unjustified flow of values to a malicious actor should imply a flow of logging or other data which are alarms themselves or can, aided by an element evaluating the data (e.g., by performing data mining on them) produce alarms and appropriate actions, e.g., causing "satisfaction" in a control element.

It is noted that countermeasures found against combinations on a more refined level do not necessarily help against the scenarios considered on a less refined level, since other possibilities of realization will be possible. However, vice versa, countermeasures on a less refined level will mostly help against a more refined level fraud scenario, but might have to be expressed in a more refined level, and in different ways.

The system (realizing the presented method) might, based on an unknown scenario, eventually also compute sets of countermeasures each of which would be said to be sufficient to prevent all, or a certain set of, the considered attacks, in the considered scenario. If such countermeasures are included in elements, the presented method combining elements to scenarios can then verify if such elements still allow the considered attacks, and under which assumptions, in the considered model.

Elements considered at a less refined level (and maybe expressing complete scams) might get associated with own countermeasures which might exist additionally to the set of countermeasures against their more-refined-level elements. Also, sets of countermeasures can be defined against certain set of elements.

Alternatively, an expert system could propose improvements, based on known patterns on how to improve elements, i.e., based on very general elements showing very generally how to replace other very general (sets of) elements. At least, very rough countermeasures might be proposed, e.g., showing example elements just as patterns and how to improve them.

Before adding improved (sets of) elements to certain scenarios/elements/sets of elements, manually or aided by an expert system, or replacing such, it would be advisable to check the new assumed scenario by a search, just to not omit suggestive improvements. Of course, different improvements, solving different parts of the problem on different degrees, each for certain reasonable requirements can be checked.

The output of such an improvement might identify critical flows of items. A further improvement and check can be performed iteratively based on the results on the previous checks, until the improved scenario is considered reasonable enough to be stored in the database, (optionally) together with links to those sets of elements which have been improved (and with information on in which way). Nevertheless, fraudulent flows of items might persist, and (if no measurements are proposed) stay in the database as information for a risk to be taken.

For example, it could be identified in a search run (based on the presented method) that a software component filtering dialed numbers can be manipulated, by previously installed malicious software on the same system, in order to let pass through certain expensive service numbers, or to not filtering at all.

The countermeasures included in or as improved elements need not necessarily exist yet; however they should be realistic concepts.

Some of the identified countermeasures might just be actions to take care of the own system and reduce the degree of gullibility. Other countermeasures (e.g. for fraud detection, e.g., based on data mining) might be promising approaches to prevent a certain percentage of fraud attacks, however maybe at the expense of producing "false positives," e.g., also rejecting even a certain percentage of customers because of suspicious appearance, but perfectly benign, behavior. Even such information about blocked desired flows of items can be added to the countermeasures, and it can be identified by the presented method, based on appropriate search criteria. The quality of the system depends on the knowledge involved in the database on elements and countermeasures, and a comprehensive up-to-date knowledge will ideally recommend the best set of countermeasures against the newly identified potential attack, and additionally even give information to assess the value of the proposed countermeasure.

Two ideas are sketched here to identify potential of fraud in a system, from the point of view of one or more actors: (A) based on information about the system which can be used to construct the corresponding elements of those actors, (B) based on interaction with the potentially malicious components, to find out the flows of items between the elements considered benign and the potentially malicious side.

The idea here is to build an expert system which can detect elements in a target system and investigate them for their potential of fraud. This can be possible if, e.g., in (A), the code, or the specifications, or the scheme to be performed, of the target system, are known, given in any (maybe specific) language. Based on the code, or the specification, or any description of the target system or scheme in another clear description, equivalents or matches to elements already described in the (database of the) expert system are tried to be identified in the target system. This is basically done by matching the interfaces and flows of items exchanged of the parties considered. The code or specs or scheme might also be given only for one (set of) actor(s) involved—who, in reality, might be interested to find out its own potential of being deceived by any other set of actors involved or outside the scenario. The expert system might then detect that, if the party agrees to make business (or else) using that code or scheme, a fraudster on the other side or outside could obtain valuable items in an unjustified way. The point is, in certain cases, potential for fraud might be identified in the target system by just considering the items to be exchanged, and based on connectable malicious elements.

For the search, all combinations are interesting which comprise the elements of any use cases the target system can perform (including all cases of exception handling), participate, or be affected, or more generally: all states it can hold, and all interfaces which might exist. Note that even if the target system is not doing anything on purpose, it might be made to leak information. The search will look for known malicious elements which could be connected, or which could be replaced by malicious elements, or which just could be combined with elements of the target system, to build a fraud scenario.

The quality of such a system again depends on the collected knowledge which basically consists of the known elements modeled from the given scenarios and on the accuracy the target system is modeled by elements, by the expert system.

Alternatively to identifying elements automatically based on given specification and/or code of the target system (just consider the case such information is not available), the system could be trimmed to automatically identify certain elements of the target system.

There are two possibilities i), ii), which can also be used complementary. Both try to find out the potential for fraud for a set of actors as potential victims. It is noted that malicious actors do not have necessarily to be at the outside, but could also be inside (e.g., a machine running a Trojan horse installed by an insider).

i) The actors (or more precisely, the corresponding parties in real life) could interactively be asked to describe their system via given templates, e.g., several use cases from their point of view, including exception handling. Such questions might, among others, concern the information the actor has to provide to another actor, and under which assumptions, in which order, and generally ask questions about the user's machine and habits (e.g., for inspecting log files, check code signature, download software from unknown sources, etc.). Certain elements of this (set of) actor(s) can then be concluded automatically. The fraud potential can then be determined by searching which malicious elements can be connected.

ii) Suspicious actors can be tested out. This means, on behalf of the set of actors, some fake entities (or test machines which cannot much be hurt) might partially enter the scenario (e.g., by pretending to accept the deal, or by otherwise provoking responses from the other side) and continue this at least up to a point where potential for fraud could be concluded, by modeling parts of the own elements which would have to be performed, and parts of the other side which have been recognized. The other side might be modeled in any way, e.g., as benign as possible. Then, the fraud potential for the set of actors can then be determined by finding malicious alternative elements for the other side.

Additionally, the deviation of the correct behavior of a component can be checked in this way, if the correct behavior is known. This method might be used to detect insider attacks.

This method can also be used in cases where a user wants to check if he can trust in the business software which he got from a business partner.

Of course, method ii) is limited due to the information which can be obtained by asking, or by testing. For instance, if the test stops participating in the scenario because one risk has been identified, another risk might stay undetected. Furthermore, a malicious actor could act in a benign way if the values concerned are small, and act in a malicious way if the values are big enough. This can probably not be detected. However, found fraud potential with small value would at least be a subset of the fraud potential with high value.

Additionally, this method can also be used together with measures for fraud detection and prevention. For instance, the system (implementing the presented method) might also be designed to be used by laymen to decide if the system they are using, e.g., for business with a (suspicious) business partner is safe enough. The results for such a layman might imply that, for being safe, the layman should install a personal firewall, not download nor install any software, not enable ActiveX, not provide credit card information to anybody not trusted, not execute unknown files and scripts, etc.

Information on the risk of elements or certain combinations of elements, with respect to fraud attacks, can be included, to enable an assessment of probability and damage of attacks, and/or of achieving certain risky or save states. This information should be updated if new kinds of attacks turn up, or if the probability changes due to better knowledge. Previous runs of the presented method should then be re-run, to obtain up-to-date recommendations and risk assessments. For this purpose, artificial states might be added into the elements which, e.g., indicate a state where the actor is waiting in vain for items of another party. This step can anyway be added for all elements for which (and as soon as) it is clear that a malicious element can be connected for interaction, to facilitate the search for malicious combinations.

Resulting risks can be computed for (part of, or) a complete scenario, for any actor, by using the information on risks in single elements or part of scenarios given or computed before. Precondition is that an appropriate model is used which takes correlations into account, as far as appropriate, and that the necessary information is available. The certainty of the computed risk should also be indicated, if appropriate. Target systems might be investigated regarding the risks for each actor involved. If circumstances change, such assessments should be re-done.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in a computer system, or in a distributed fashion wherein different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

I claim:

1. A method for detecting unknown scenarios in a data processing system, the method comprising the steps of:
    storing in a database known scenario data describing one or more known scenarios, said known scenario data describing how actors in a system model act and interact;
    using a processor device performing:
        A) splitting the known scenarios into elements, each element relating to at least one of: an actor a, and an action x of said actor;
        B) receiving an assumption describing an end state in which a possible scenario can result in order to assess a potential for fraud, wherein said assumption is not an end state of a known scenario in the system model;
        C) beginning with the assumption as a root node, constructing a scenario tree by:
            1) assigning each element to a node;
            2) generating at least one path comprising one or more nodes associated from said root node, wherein each path in the scenario tree represents a different possibility to reach the end state of the possible scenario according to the assumption by:
                a) at a current path in the scenario tree, selecting a node associated with an actor a;
                b) adding the selected node a to the current path, wherein said node a can be added to multiple paths;
                c) repeatedly performing the following steps for each actor a in the system model for each different possibility to reach the end state:
                    i) selecting at least one intermediate node representing an action x of the node a;
                    ii) adding the at least one intermediate node to the scenario tree; and
                    iii) adding at least one node representing a requirement necessary for the actor a to perform the action x specified in the at least one intermediate node;
                d) interconnecting the nodes of each path in the scenario tree to form a possible scenario;
                e) comparing each possible scenario to the known scenarios stored in the database;
                f) eliminating the known scenarios from the tree, leaving the unknown scenarios; and
                g) identifying the unknown scenarios as new scenarios in order to assess their potential for fraud.

2. The method according to claim 1, wherein assigning each element to a node comprises describing said element using a state transition description.

3. The method according to claim 1, comprising a step of extracting at least one element data from the known scenario data.

4. The method according to claim 1, wherein each element comprises:
    a property of the actor a.

5. The method according to claim 1, wherein the action x comprises a transfer of an item.

6. The method according to claim 1 wherein, when contradictions occur, successive nodes of one path are cut beginning with an end of the path, until no contradictions with at least one of assumptions and requirements in any nodes of the respective path exist, and wherein a new requirement is added to a last remaining node wherein the added requirement is a negation of a contradicting assumption or requirement.

7. The method according to claim 2 wherein the assumption of a currently generated node which complies with the requirement fulfils the requirement.

8. The method according to claim 7, further comprising:
    D) verifying if a predetermined behavior of an actor a can prevent the possible scenario, wherein the method is performed by using a first set of element data derived from one or more provided first scenario data so that a first created scenario data is generated;
    wherein the behavior is described by one or more elements which are added to the first set of element data or replace one or more elements of the first set of elements to obtain a second set of element data; and
    wherein the method is performed using the second set of elements so that a second set of created scenario data is generated;
    wherein the first and the second set of scenario data are compared by a comparator device, the result of the comparing indicating whether or not the predetermined behavior can prevent one or more scenarios.

9. The method according to claim 1, wherein element data is generated by using transaction data and corresponding reaction data obtained by performing the steps of:

A.1) storing transaction data in a transaction database;
A.2) using a processor providing the transaction data from the transaction database;
A.3) using the processor performing the transaction determined by the transaction data related to one or more actors;
A.4) using the processor detecting a reaction related to the transaction and generating the reaction data;
A.5) storing the reaction data in the transaction database; and
A.6) using the processor generating an element data depending on the transaction data and the reaction data;
wherein elements are combined with regard to one or more associated requirements to obtain the subsets of elements and each of the subsets describes one or more possible scenarios.

10. The method according to claim 9, wherein the step of splitting the known scenario data into elements is performed by constructing a state transition diagram.

11. A computer system for detecting unknown scenarios, said computer system comprising:
   a scenario database storing known scenario data describing one or more known scenarios, said known scenario data describing how actors in a system model act and interact; and
   a processor device performing:
      A) splitting the known scenarios into elements, each element relating to at least one of: an actor a, and an action x of said actor;
      B) receiving an assumption describing an end state in which a possible scenario can result in order to assess a potential for fraud, wherein said assumption is not an end state of a known scenario in the system model;
      C) beginning with the assumption as a root node, constructing a scenario tree by:
         1) assigning each element to a node;
         2) generating at least one path comprising one or more nodes associated from said root node, wherein each path in the scenario tree represents a different possibility to reach the end state of the possible scenario according to the assumption by:
            a) at a current path in the scenario tree, selecting a node associated with an actor a;
            b) adding the selected node a to the current path, wherein said node a can be added to multiple paths;
            c) repeatedly performing the following steps for each actor a in the system model for each different possibility to reach the end state:
               i) selecting at least one intermediate node representing an action x of the node a;
               ii) adding the at least one intermediate node to the scenario tree; and
               iii) adding at least one node representing a requirement necessary for the actor a to perform the action x specified in the at least one intermediate node;
            d) interconnecting the nodes of each path in the scenario tree to form a possible scenario;
            e) comparing each possible scenario to the known scenarios stored in the database;
            f) eliminating the known scenarios from the tree, leaving the unknown scenarios; and
            g) identifying the unknown scenarios as new scenarios in order to assess their potential for fraud.

12. A program storage device readable by a machine, tangibly embodying a program of instructions executable by the machine to perform method steps for detecting unknown scenarios in a system model, said method comprising steps of:
   storing in a database known scenario data describing one or more known scenarios, said known scenario data describing how actors in a system model act and interact;
   using a processor device performing:
      A) splitting the known scenarios into elements, each element relating to at least one of: an actor a, and an action x of said actor;
      B) receiving an assumption describing an end state in which a possible scenario can result in order to assess a potential for fraud, wherein said assumption is not an end state of a known scenario in the system model;
      C) beginning with the assumption as a root node, constructing a scenario tree by:
         1) assigning each element to a node;
         2) generating at least one path comprising one or more nodes associated from said root node, wherein each path in the scenario tree represents a different possibility to reach the end state of the possible scenario according to the assumption by:
            a) at a current path in the scenario tree, selecting a node associated with an actor a;
            b) adding the selected node a to the current path, wherein said node a can be added to multiple paths;
            c) repeatedly performing the following steps for each actor a in the system model for each different possibility to reach the end state:
               i) selecting at least one intermediate node representing an action x of the node a;
               ii) adding the at least one intermediate node to the scenario tree; and
               iii) adding at least one node representing a requirement necessary for the actor a to perform the action x specified in the at least one intermediate node;
            d) interconnecting the nodes of each path in the scenario tree to form a possible scenario;
            e) comparing each possible scenario to the known scenarios stored in the database;
            f) eliminating the known scenarios from the tree, leaving the unknown scenarios; and
            g) identifying the unknown scenarios as new scenarios in order to assess their potential for fraud.

13. The program storage device of claim 12, wherein each element comprises a property of the actor a.

14. The program storage device of claim 12, wherein the action x associated with the actor a comprises a transfer of an item.

15. The program storage device of claim 12, wherein the processor device further performs:
   C.2.d.i) when contradictions occur, successive nodes of one path are cut beginning with the end of the path, until no contradictions with at least one of assumptions and requirements in any nodes of the respective path exist, and wherein a new requirement is added to the last remaining node wherein the added requirement is the negation of the contradicting assumption;
   C.2.d.ii) wherein the assumption of the currently created node which complies with the requirement fulfils the requirement; and
   D) verifying if a predetermined behavior of an actor a can prevent a possible scenario;

wherein the method is performed by using a first set of element data derived from one or more provided first scenario data so that a first created scenario data is generated;

wherein the behavior is described by one or more elements which are added to the first set of element data or replace one or more elements of the first set of elements to obtain a second set of element data;

wherein the method is performed using the second set of elements so that a second set of generated scenario data is created; and wherein the first and the second set of scenario data are compared using a comparator device, the result of the comparing indicating whether or not the predetermined behavior can prevent one or more scenarios.

16. The program storage device of claim 13, wherein element data is generated by using transaction data and corresponding reaction data obtained by performing the steps of:

A.1) storing transaction data in a transaction database;

A.2) using a processor device providing the transaction data from the transaction database;

A.3) using the processor device performing the transaction determined by the transaction data related to one or more actors a;

A.4) using the processor device detecting a reaction related to the transaction and creating the reaction data;

A.5) storing the reaction data in the transaction database; and

A.6) using the processor device creating an element data depending on the transaction data and the reaction data;

wherein elements are combined with regard to one or more associated requirements to obtain the subsets of elements and each of the subsets describes one or more possible scenarios.

* * * * *